United States Patent
de Goycoechea

(10) Patent No.: US 11,146,976 B2
(45) Date of Patent: Oct. 12, 2021

(54) INTELLIGENT DISTRIBUTED ANTENNA SYSTEM MONITORING

(71) Applicant: Ricardo Matias de Goycoechea, Cordoba (AR)

(72) Inventor: Ricardo Matias de Goycoechea, Cordoba (AR)

(73) Assignee: Fiplex Communications, Inc., Miami, FL (US)

( * ) Notice: Subject to any disclaimer, the term of this patent is extended or adjusted under 35 U.S.C. 154(b) by 0 days.

(21) Appl. No.: 16/730,366

(22) Filed: Dec. 30, 2019

(65) Prior Publication Data

US 2020/0213880 A1    Jul. 2, 2020

Related U.S. Application Data

(60) Provisional application No. 62/786,814, filed on Dec. 31, 2018.

(51) Int. Cl.
| | |
|---|---|
| *H04W 24/04* | (2009.01) |
| *H04W 64/00* | (2009.01) |
| *H04W 16/26* | (2009.01) |
| *H04B 17/17* | (2015.01) |
| *H04W 88/08* | (2009.01) |

(52) U.S. Cl.
CPC ............ *H04W 24/04* (2013.01); *H04B 17/17* (2015.01); *H04W 16/26* (2013.01); *H04W 64/003* (2013.01); *H04W 88/085* (2013.01)

(58) Field of Classification Search
CPC ... H04W 24/04; H04W 16/26; H04W 64/003; H04W 88/085; H04B 17/17
See application file for complete search history.

(56) References Cited

U.S. PATENT DOCUMENTS

| | | | | |
|---|---|---|---|---|
| 2009/0096683 | A1* | 4/2009 | Rosenblatt | H01Q 1/242 343/702 |
| 2011/0237182 | A1* | 9/2011 | Stratford | H04W 52/52 455/7 |
| 2013/0260705 | A1* | 10/2013 | Stratford | H04W 24/08 455/226.1 |
| 2014/0118151 | A1* | 5/2014 | DePoy | H01Q 1/2233 340/635 |

\* cited by examiner

*Primary Examiner* — Joshua L Schwartz
(74) *Attorney, Agent, or Firm* — The Brickell IP Group, PLLC; Rafael Perez-Pineiro; Richard Guerra

(57) ABSTRACT

An intelligent distributed antenna system is disclosed which improves upon known distributed antenna systems particularly with respect to identifying failures or anomalies in the system. The disclosed system includes a signal source, a master unit, and one or more remote units each connected to antennas for transmitting radio frequency signals to terminal units and each connected to the master unit through fiber. The remote units, the master unit, or both may include power signal readers. The remote units may be configured to determine a point of failure in the system based on the power measured from reflected signals. The master unit can be in communication with the remote units to generate alarms and reports as well as to control the system in response to detection of a failure or anomaly.

10 Claims, 3 Drawing Sheets

INTELLIGENT DISTRIBUTED ANTENNA SYSTEM MONITORING

CROSS REFERENCE TO RELATED APPLICATIONS

This application claims the benefit of U.S. Provisional Application No. 62/786,814 filed Dec. 31, 2018, the disclosure of which is hereby incorporated herein by reference in its entirety.

FIELD OF THE DISCLOSURE

This disclosure relates generally to signal monitoring and detection of faulty antennas in antenna systems.

BACKGROUND

A signal source 10 can be utilized to transmit radio frequency signals, such as signals from cellular networks, WiFi, LTE systems, public safety systems, and others. A signal source 10 could be a base transceiver station, a small cell, a signal booster such as a bidirectional amplifier ("BDA") or repeater, or any other equivalent signal source. Antenna systems connected to the signal source may be utilized to cover specific areas or locations such as a building, an underground subway station, a basement, a parking lot, a stadium, or other structure. The connection between the signal source and the antenna system can be implemented through a distribution network that may include both physical and wireless connections, and the design of the distribution network may require utilizing splitters or couplers to distribute the signals to a plurality of antennas. The antenna system may generate coverage areas for transmitting downlink signals 21, which are signals generated by the signal source 10, to terminal units 18 such as cell phones, tablets, IoT devices, walkie talkies, radios, or other receiver or transceiver devices. The terminal units 18 may conversely transmit uplink signals 22 back through the antenna system and distribution network.

Problems may arise, however, if one of the antennas fails, which may occur if the antenna 16 is damaged or disconnected, or if the functionality of the antenna 16 has been altered. Detecting and identifying a failed antenna can be difficult in complex systems. In a simple antenna system, where a single antenna 16 is connected to signal source 10 through BDA 12, the BDA 12 may have the capability of determining whether an antenna has been disconnected because upon disconnection the downlink signal 21 may reflect back to BDA 12 as a reflected signal 23 which has been severely attenuated.

FIG. 1 illustrates a prior art communications system functioning properly, and FIG. 2 illustrates the prior art communication system of FIG. 1 with a defective antenna (for example a short circuit, open circuit, or any other state that generates a malfunction resulting in a reflected signal back to the bidirectional amplifier) thereby demonstrating how the reflection of a downlink signal 21 may result in identification of a damaged antenna 16. In this prior art system, a signal source 10 may provide a downlink signal 21 to a signal booster or bidirectional amplifier 12, which could function to the boost the downlink signal 21 to an antenna 16 servicing a remote coverage area. Here, the signal booster 12 is equipped with an incident and reflected power meter, such that in the event the coaxial connector to the output port of the signal booster becomes disconnected, the power meter can detect reflected power 23 as an indication of a no load condition or mismatched impedance. The detection of reflected power would indicate that there is a failure or fault in the distribution network, which could result in the signal booster 12 generating an alarm alerting the system administrator that the distribution network is not operating properly and there could be a potential problem with the emission of radio signals in the coverage area leaving terminal units without coverage.

In this known system, detection of reflected signal power is directly linked to the attenuation experienced by downlink signal 21 from the time it is reflected until the time the reflected signal 23 is received by the power meter in the signal booster 12. FIG. 2 illustrates the attenuation of downlink signal 21 and reflected signal 23. The reflected signal 23 could be generated by a disconnection of the coaxial cable or by an impedance problem or mismatch in the transmission line. If the reflection occurs at the output connector, such as if the coaxial output connector is disconnected, the reflection can be easily detected and measured without any attenuation. On the other hand, if the reflection occurs at one of numerous points along the transmission line, such as far down the coaxial cable possibly after it has been split numerous times, the reflected signal must return from the point of failure 24 back to the signal booster a certain travel distance. The travel distance introduces signal attenuation for the reflected signal 23 diminishing if not eliminating the ability of signal booster 10, equipped with a power meter, to detect anomalies in the distribution network. FIGS. 2 and 3 illustrate introduction of a point of failure 24 in the system.

Further complicating the situation is the use of signal splitting devices 14, such as a splitter or coupler, which are common in designing distribution networks. Splitting downlink signals 21 further attenuates the reflected signal 23, and in some instances can even absorb signals possibly preventing reflected signal 23 from ever reaching signal booster 12.

Known solutions for improving the failure detection of particular antennas in signal distribution networks have proven inadequate. One known solution is to place a voltage standing wave ratio alarm at the signal source output, although it fails to account for the signal attenuation issues described above. Another known solution is to increase the granularity of the signal source, meaning that each signal source manages a very small number of antennas which are connected through very short paths of distribution to reach terminal units in a coverage area. This is a significant design limitation, however, as it requires installation of a large number of signal sources, which could be costly.

BRIEF SUMMARY OF THE DISCLOSURE

The following presents a simplified summary of the disclosure in order to provide a basic understanding of some aspects of the various embodiments disclosed herein. This summary is not an extensive overview of every detail of every embodiment. It is intended to neither identify key or critical elements of every embodiment nor delineate the scope of every disclosed embodiment. Its sole purpose is to present some concepts of disclosure in a simplified form as a prelude to the more detailed description that is presented later.

In one embodiment of the disclosure an antenna monitoring system includes a master unit configured to receive a downlink signal from a signal source, a remote unit connected with the master unit through fiber, and forming a distributed antenna system together with the master unit, to receive the downlink signal from the master unit, the remote unit including a signal power detector; and an antenna connected to the at least one remote unit, the antenna broadcasting the downlink signal to a coverage area. The signal power detector is configured to detect a reflected signal generated by a point of failure in the system and measure a power of the reflected signal.

The following description and annexed drawings set forth certain illustrative aspects of the disclosure. These aspects are indicative, however, of but a few of the various ways in which the principles disclosed may be employed. Other advantages and novel features disclosed herein will become apparent from the following description when considered in conjunction with the drawings.

DETAILED DESCRIPTION OF THE DISCLOSURE

The following detailed description and the appended drawings describe and illustrate some embodiments for the purpose of enabling one of ordinary skill in the relevant art to make use the invention. As such, the detailed description and illustration of these embodiments are purely illustrative in nature and are in no way intended to limit the scope of the invention, or its protection, in any manner. It should also be understood that the drawings are not necessarily to scale and in certain instances details may have been omitted, which are not necessary for an understanding of the disclosure, such as details of fabrication and assembly. In the accompanying drawings, like numerals represent like components.

Figure 1:
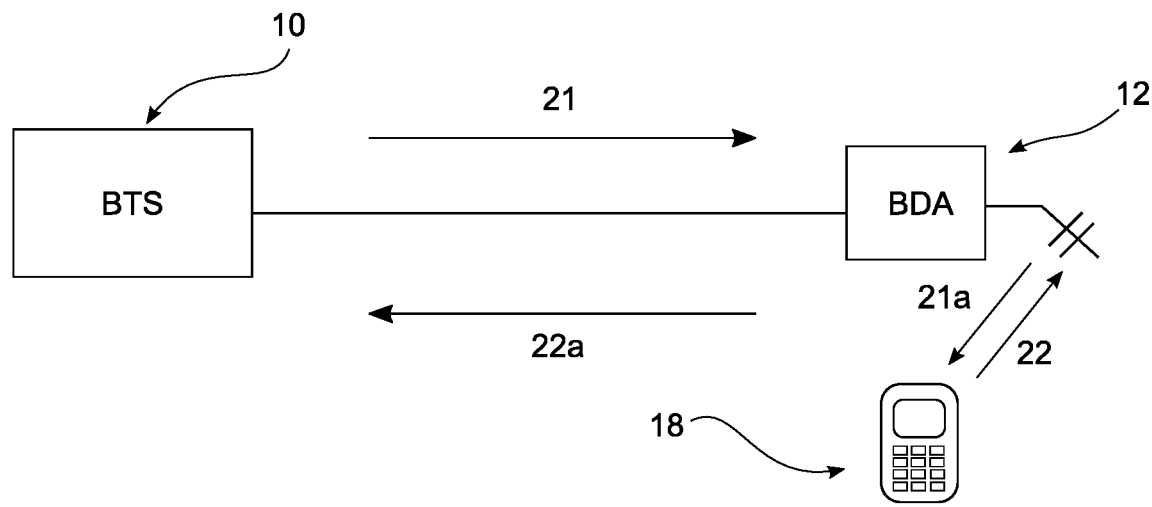
FIG. 1 illustrates a prior art signal distribution network.
Figure 2:
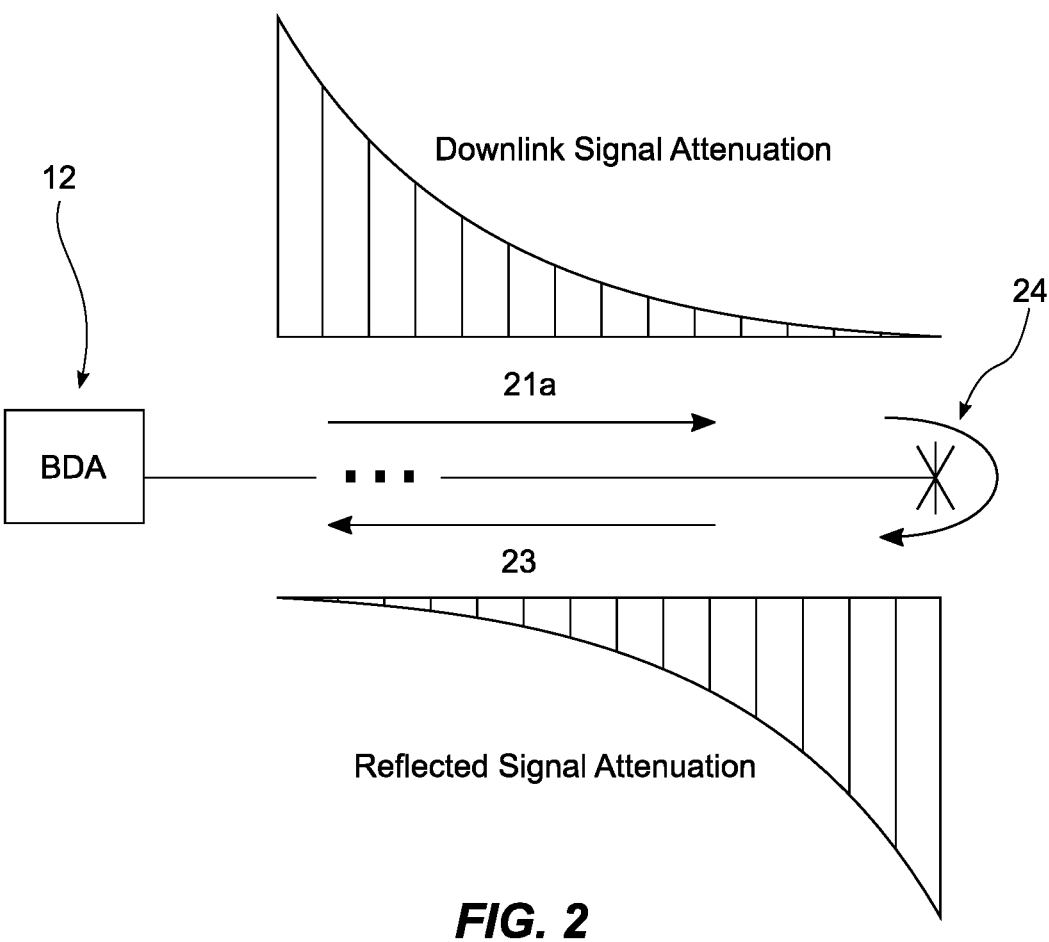
FIG. 2 illustrates the prior art network of FIG. 1 with a failure point in the network.
Figure 3:
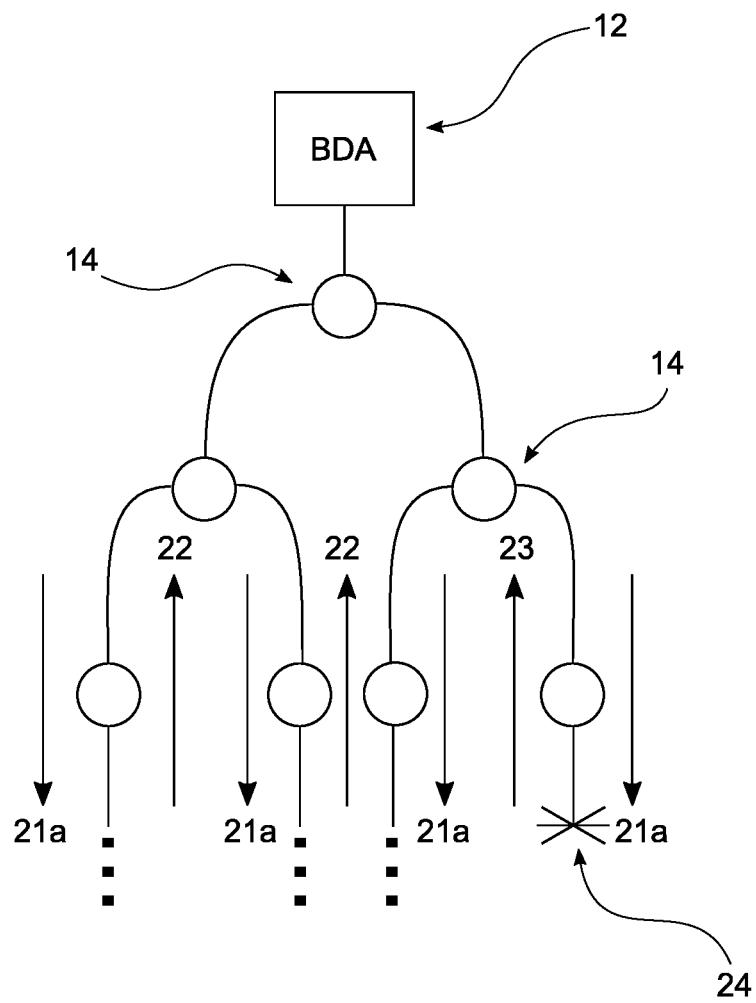
FIG. 3 illustrates a prior art signal distribution network having signal splitters and a failure point in the network.
Figure 4:
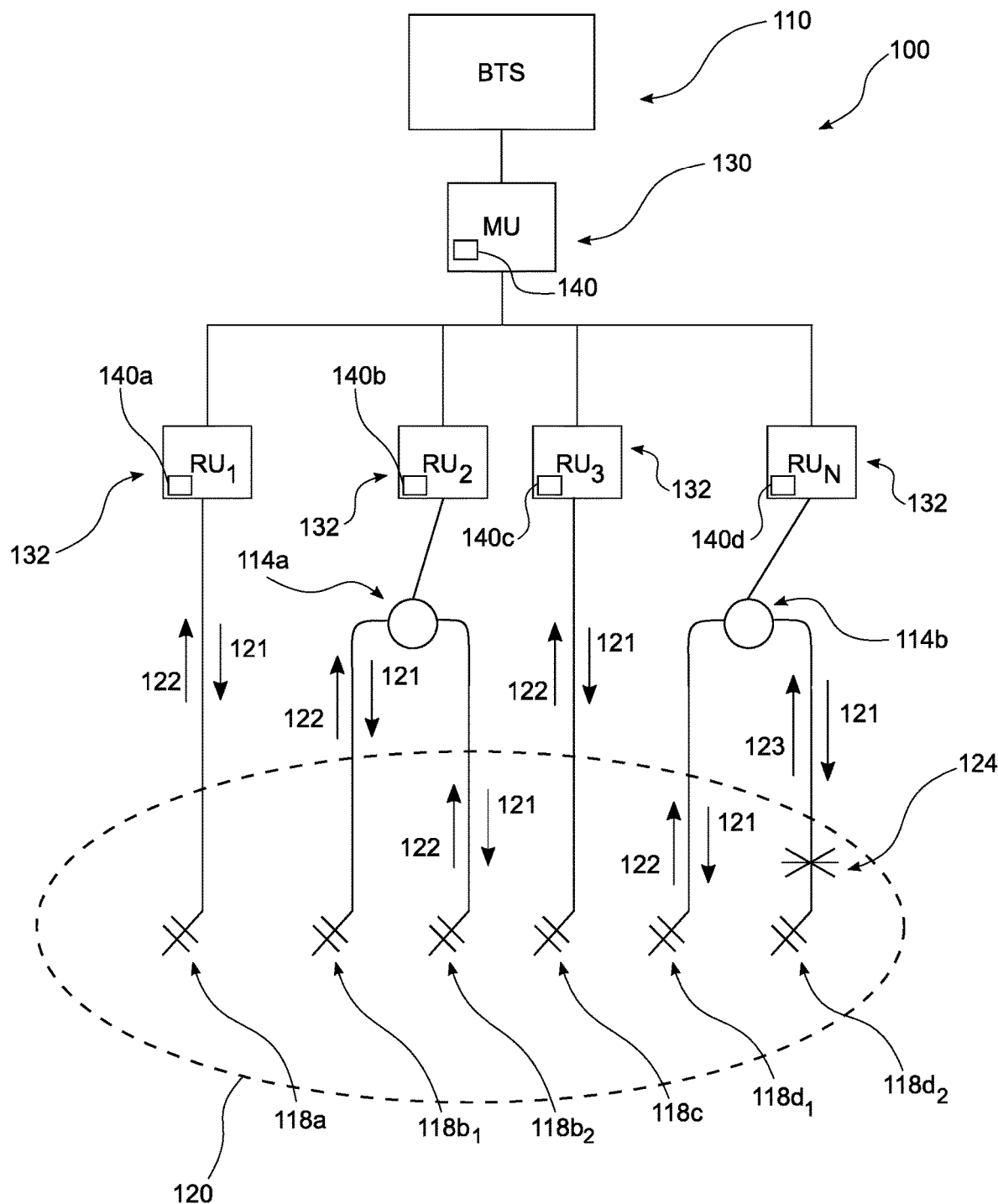
FIG. 4 illustrates an embodiment of an antenna monitoring system implemented through a distributed antenna system.

Referring now to FIG. 4, a distributed antenna system 100 may include a signal source 110, a master unit 130 coupled or connected to an output port of signal source 110 through an air interface or physical connection, and one or more remote units 132 coupled or connected to the input connectors of a plurality of antennas 118, which collectively broadcast to a coverage area 120. The remote units 132 may connect through fiber with the master unit 130 to form a digital fiber distributed antenna system. Introduction of master unit 130 and remote units 132 reduce signal attenuation as compared to utilizing a signal booster as described above with respect to known systems. In addition to directing downlink signals 121 and uplink signals 122 between coverage area 120 and signal source 110, master unit 130 and remote units 132 may be in communication with one another in order to exchange operational information. Signal power readers 140 (which may include VSWR metering functionality) may be incorporated into master unit 130, remote units 132, or both. Because the remote units are coupled to antennas 118, remote units may be configured to measure both downlink signal 121 power as well as reflected signal power 123 should an antenna 118 fail or, generally speaking, if there is a point of failure 124 downstream from one of the remote units 132.

In one embodiment, a signal power reader 140 may be incorporated into the master unit 130 on the side opposite of the remote units 132 so that the signal power reader 140 is connected to the donor antenna port facing the BTS 110 (when the interface between the BTS 110 and the master unit 130 is an air interface. In one embodiment, the signal power reader 140 may be incorporated into the remote units 132 by connecting the signal power reader 140 with the service antenna ports that feed antennas 118.

Remote units 132 may be in constant communication with master unit 130 through a control unit communications network, and remote units 132 may report if they have detected a reflected signal 123. The control unit communications network allows master unit 130 to report to a system operator a failure or other anomaly with a high level of precision in terms of identifying the point in the system 100 where the point of failure 124 is likely to exist. The reporting feature may include an alarm to alert a system administrator that a failure or anomaly has developed. The alarm may be implemented by sending a signal from the master unit 130 that could trigger an LED panel at the network manager's location to warn that a point of failure 124 has been identified. The alarm may also be implemented by sending SNMP traps to an NMS server over the internet.

The master unit 130, through the control unit communications network maintained with remote units 132, may be able to ascertain the signal level that reaches each remote unit 132. By comparing these signal power levels with baseline power levels uploaded to the system for known comparison, the master unit can determine if there has been an increment in the losses of the signal distribution network and can report the increased losses affecting the operation of the system.

Through the control unit communications network maintained between master unit 130 and remote units 132, master unit 130 can be configured to also report the failure of the one or more remote units 132. The failure of a remote unit 132 can be interpreted as a major system malfunction or failure likely to seriously affect the operation of the system. A higher level alarm may be associated with this major malfunction or failure.

Master unit 130 may be operable to control downlink signal 121 transmission in further response to the detection of anomalies or failures in the system. Through its communications network with the remote units 132, master unit 130 may command the remote unit 132 closest to the point of failure 124 to cease transmission of downlink signals 121 through the remote unit 132. Either master unit 130 or remote unit 132 could also be in communication with a switch built into the signal splitters or couplers 114 in the network to operate a switch therein to prevent further splitting of the downlink signal 121. Consequentially, master unit 130 can prevent wasteful continued splitting of the downlink signal 121 where downlink signal 121 is being sent towards a point of failure 124 in the network. As a result of ceasing the propagation of downlink signals 121 to a malfunctioning portion of the network, a stronger downlink signal 121 may be sent to the remainder of the network to compensate for the loss of a portion of the network at or downstream from the point of failure 124. Master unit 130 may operate to switch off downlink signals 121, as described herein, automatically in response to any failure or anomaly, major or otherwise. For example, the master unit 130 may be configured to automatically switch off radio frequency signal passage should a power meter within remote unit 132 detect a reflected signal having a certain power level or if the entire remote unit becomes inoperable. If the reflected signal has too low of a power, as predetermined as appropriate by an architect of the network, then the point of failure 124 may be too far downstream from that particular remote unit 132 to justify discontinuation of signal transmission as an appropriate response. An automatic shutoff action could be included in the report to the system operator. The system report could also include the change in downlink signal 121 power measurement at the other remote units 121 in response to a partial network shutoff so that the administrator can determine the likely affect to the signal coverage area. Such information would be useful to inform users of terminal units within the coverage area of network outages within particularly identifiable portions of the coverage area.

The descriptions set forth above are meant to be illustrative and not limiting. Various modifications to the disclosed embodiments, in addition to those described herein, will be apparent to those skilled in the art from the foregoing description. Such modifications are also intended to fall within the scope of the concepts described herein. The disclosures of each patent, patent application, and publication cited or described in this document are hereby incorporated herein by reference, in their entireties.

The foregoing description of possible implementations consistent with the present disclosure does not represent a comprehensive list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims. Further, the limitations of the following claims are not written in means-plus-function format and are not intended to be interpreted based on 35 U.S.C. 112(f), unless and until such claim limitations expressly use the phrase "means for" followed by a statement of function void of further structure.

What is claimed:

1. An antenna monitoring system comprising:
    a master unit configured to receive a downlink signal from a signal source;
    a remote unit connected with the master unit through fiber, and forming a distributed antenna system together with the master unit, to receive the downlink signal from the master unit, the remote unit including a signal power detector;
    an antenna connected to the at least one remote unit, the antenna broadcasting the downlink signal to a coverage area,
    wherein the signal power detector is configured to detect a reflected signal generated by a point of failure in the system and measure a power of the reflected signal; and
    wherein the master unit is configured to identify whether the remote unit or additional remote unit is closest to the point of failure in the system.

2. The system of claim 1 wherein the remote unit is operable to communicate the power of the reflected signal to the master unit.

3. The system of claim 2 wherein the master unit is configured to associate the power of the reflected signal with a system failure, and report the system failure to a system operator.

4. The system of claim 2 wherein the remote unit and the master unit are in constant communication.

5. The system of claim 1 further comprising:
    an additional remote unit connected with the master unit to receive the downlink signal from the master unit, the additional remote unit including an additional signal power detector; and
    a signal splitter provided between the master unit, on the one hand, and the remote unit and the additional remote unit, on the other hand, to split the downlink signal from the master unit to the remote unit and the additional remote unit.

6. The system of claim 5 wherein the remote unit and additional remote unit are in communication with the master unit to communicate the power of the reflected signal to the master unit.

7. The system of claim 6 wherein the master unit is configured to associate the power of the reflected signal with a system failure, and report the system failure to a system operator.

8. The system of claim 1 wherein the master unit is configured to operate a switch within the remote unit as well as an additional switch within the additional remote unit, and the master unit is further configured to automatically operate the switch and additional switch in response to detecting a reflected signal having a predetermined power level.

9. The system of claim 1 wherein the report of the system failure includes identifying whether the remote unit or additional remote unit is closest to the point of failure in the system.

10. The system of claim 1 wherein the master unit is configured to operate a splitter switch proximate the signal splitter to prevent downlink signal transmission to either the remote unit or the additional remote unit.

* * * * *